US011926091B2

(12) United States Patent
Olevsky et al.

(10) Patent No.: US 11,926,091 B2
(45) Date of Patent: Mar. 12, 2024

(54) IN SITU PARTIALLY DEGRADABLE SEPARATION INTERFACE FOR FABRICATION OF COMPLEX NEAR NET SHAPE OBJECTS BY PRESSURE ASSISTED SINTERING

(71) Applicants: Eugene Olevsky, San Diego, CA (US); Charles Maniere, Toulouse (FR)

(72) Inventors: Eugene Olevsky, San Diego, CA (US); Charles Maniere, Toulouse (FR)

(73) Assignees: UNITED STATES OF AMERICA has certain rights in the invention from DOE Grant No. DE-SC0008581, Washington, DC (US); San Diego State University, San Diego, CA (US)

( * ) Notice: Subject to any disclaimer, the term of this patent is extended or adjusted under 35 U.S.C. 154(b) by 167 days.

(21) Appl. No.: 17/042,176

(22) PCT Filed: Mar. 27, 2019

(86) PCT No.: PCT/US2019/024382
§ 371 (c)(1),
(2) Date: Sep. 27, 2020

(87) PCT Pub. No.: WO2019/191299
PCT Pub. Date: Oct. 3, 2019

(65) Prior Publication Data
US 2021/0016499 A1     Jan. 21, 2021

Related U.S. Application Data

(60) Provisional application No. 62/648,433, filed on Mar. 27, 2018.

(51) Int. Cl.
B29C 64/153     (2017.01)
B22F 10/00     (2021.01)

(52) U.S. Cl.
CPC ............ B29C 64/153 (2017.08); B22F 10/00 (2021.01)

(58) Field of Classification Search
CPC ...................................... B29C 64/153
See application file for complete search history.

(56) References Cited

U.S. PATENT DOCUMENTS 7,195,872 B2    3/2007   Agrawal et al.
7,509,240 B2    3/2009   Das et al.
(Continued)

FOREIGN PATENT DOCUMENTS

FR     3042922 A1   *   4/2017

OTHER PUBLICATIONS

Maksimova, et al. "Catalytic synthesis of carbon nanostructures from polymer precursors" Journal of Molecular Catalysis A: Chemical 158.1, Sep. 8, 2000 p. 301-307 (Year: 2000).*

(Continued)

Primary Examiner — Mohammad M Ameen
(74) Attorney, Agent, or Firm — JUNEAU & MITCHELL; Todd L. Juneau

(57) ABSTRACT

The invention relates to a process for fabricating complex mechanical shapes, and in particular to fabricating complex mechanical shapes using a pressure-assisted sintering technique to address problems relating to variations in specimen thickness and tooling, or densification gradients, by 3-D printing of a polymer model that is surrounded by and filled with sintering powder material, wherein the 3-D polymer model decomposed into a graphite interface layer and facilitates release of the cast, e.g. metal, metal-alloy, ceramic, etc., manufactured item.

6 Claims, 3 Drawing Sheets

(56) References Cited

U.S. PATENT DOCUMENTS

| | | |
|---|---|---|
| 7,547,449 B2 | 6/2009 | Gower et al. |
| 7,732,002 B2 | 6/2010 | Kodas et al. |
| 7,745,106 B2 | 6/2010 | Beretta et al. |
| 7,857,756 B2 | 12/2010 | Warren et al. |
| 8,100,996 B2 | 1/2012 | Simmons et al. |
| 8,153,148 B2 | 4/2012 | Maspero et al. |
| 8,485,861 B2 | 7/2013 | Boyden et al. |
| 8,932,184 B2 | 1/2015 | Redmond |
| 9,060,931 B2 | 6/2015 | Boyden et al. |
| 9,402,726 B2 | 8/2016 | Linderman et al. |
| 9,463,261 B2 | 10/2016 | Duvall et al. |
| 9,545,507 B2 | 1/2017 | Ross |
| 9,765,271 B2 | 9/2017 | Myrick |
| 9,801,946 B2 | 10/2017 | Guelcher et al. |
| 9,804,607 B1 | 10/2017 | Coleman |
| 9,925,299 B2 | 3/2018 | Kaplan et al. |
| 9,932,238 B2 | 4/2018 | Shankman et al. |
| 10,001,769 B2 | 6/2018 | Huang et al. |
| 10,004,602 B2 | 6/2018 | Chachques et al. |
| 10,029,083 B2 | 7/2018 | Ross et al. |
| 10,166,142 B2 | 1/2019 | Lee |
| 10,342,965 B2 | 7/2019 | Ross et al. |
| 10,472,909 B2 | 11/2019 | Xu et al. |
| 10,709,884 B2 | 7/2020 | Ross |
| 10,731,046 B2 | 8/2020 | Omenetto et al. |
| 10,912,860 B2 | 2/2021 | Griffin et al. |
| 2003/0108511 A1 | 6/2003 | Sawhney |
| 2005/0147599 A1 | 7/2005 | Hunter et al. |
| 2005/0202008 A1 | 9/2005 | Williams et al. |
| 2005/0221072 A1 | 10/2005 | Dubrow et al. |
| 2006/0204738 A1 | 9/2006 | Dubrow et al. |
| 2007/0282247 A1 | 12/2007 | Desai et al. |
| 2008/0213593 A1 | 9/2008 | Bala Subramaniam et al. |
| 2009/0162643 A1 | 6/2009 | Dubrow et al. |
| 2010/0074934 A1 | 3/2010 | Hunter |
| 2010/0249913 A1 | 9/2010 | Datta et al. |
| 2011/0008765 A1 | 1/2011 | Vacanti et al. |
| 2011/0020196 A1 | 1/2011 | Grippi et al. |
| 2013/0138209 A1 | 5/2013 | Cragg et al. |
| 2013/0177972 A1 | 7/2013 | Green et al. |
| 2013/0220336 A1 | 8/2013 | Gopal et al. |
| 2014/0200511 A1 | 7/2014 | Boyden et al. |
| 2016/0331467 A1* | 11/2016 | Slamin .................. A61B 34/20 |
| 2017/0014169 A1 | 1/2017 | Dean et al. |
| 2017/0095861 A1* | 4/2017 | Dykstra ................. B33Y 70/00 |
| 2018/0140427 A1 | 5/2018 | Conway et al. |
| 2018/0318931 A1* | 11/2018 | Estournes ........... B29C 33/0016 |
| 2019/0247650 A1 | 8/2019 | Tran |
| 2019/0330064 A1 | 10/2019 | Tour et al. |
| 2020/0155323 A1 | 5/2020 | Lang et al. |

OTHER PUBLICATIONS

Maniere, et al. Spark plasma sintering and complex shapes: The deformed interfaces approach, Powder Technology 320 (Oct. 1, 2017) p. 340-345. (Year: 2017).*

* cited by examiner

FIGURE 2

STEP 1
performing 3D printing of a polymer shell model,
e.g. ABS shell model,
of a manufactured item STEP 2
placing the polymer shell model in
a die chamber having a tool punch STEP 3
loading powder sintering material
into the die chamber
around the polymer shell model and
within any cavities
of the polymer shell model STEP 4
oxygen/hydrogen free atmosphere heating
of the powder-encased polymer shell model
to decompose the polymer shell model
creating a graphite interface layer;

STEP 5
sintering of the powder assembly;

and

STEP 6
releasing a sinter-powder cast manufactured item
from a sacrificial outer part of sintered powder FIGURE 3
Process stages
1. 3D printed ABS shell of the gear
2. Polymer shell placed in graphite die/punches tools
3. Powder loading
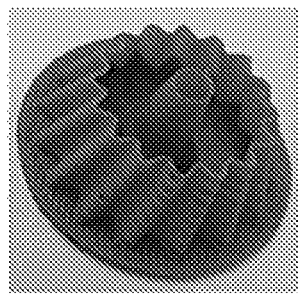
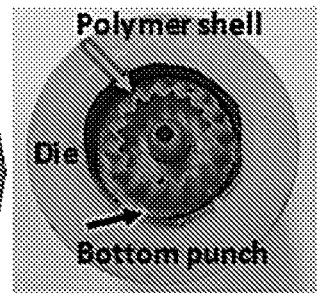
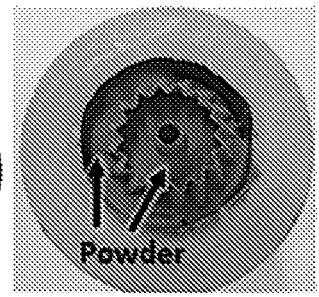
4. Post sintered pellet
5. Release of the central hole
6. Release of the gear
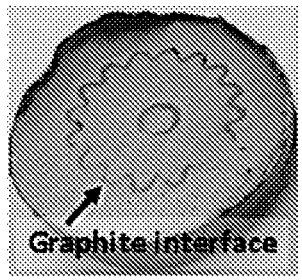
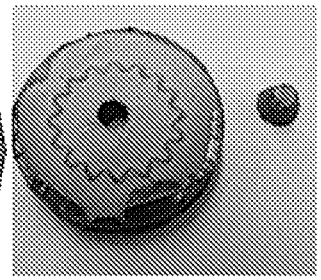
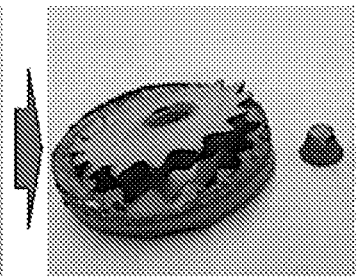
Final polished shape
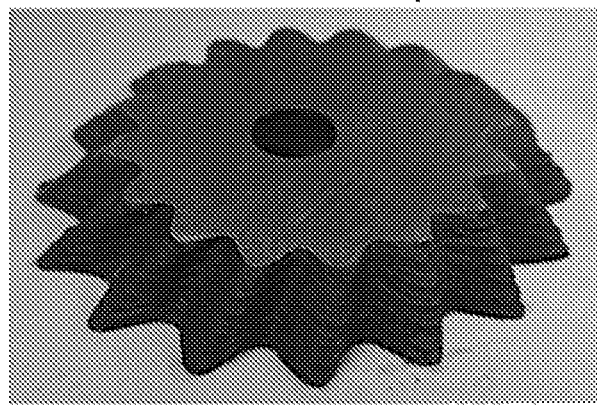
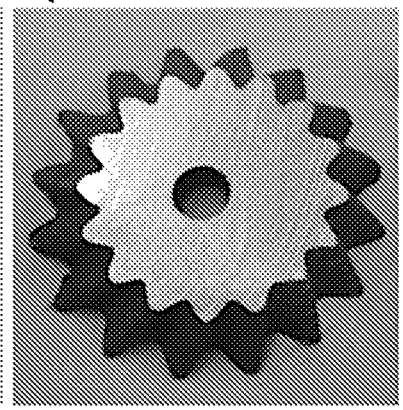

IN SITU PARTIALLY DEGRADABLE SEPARATION INTERFACE FOR FABRICATION OF COMPLEX NEAR NET SHAPE OBJECTS BY PRESSURE ASSISTED SINTERING

PRIOR COPENDING APPLICATIONS

This application is a 371 national stage patent application of international application PCT/US19/24382 filed Mar. 27, 2019, which claim the priority benefit of U.S. provisional patent application 62/648,433 filed Mar. 27, 2018.

GOVERNMENT LICENSE RIGHTS

This invention was made with government support under Grant No. DE-SC0008581 awarded by The Dept. of Energy. The government has certain rights in the invention.

STATEMENT REGARDING FEDERALLY SPONSORED R&D

The invention was made with U.S. Government support under Contract No. DE-SC0008581 awarded by the U.S. Dept. of Energy. The U.S. Government has certain rights in the invention.

CROSS-REFERENCE TO RELATED APPLICATIONS

Provided per USPTO rules by Application Data Sheet.

NAMES OF PARTIES TO JOINT RESEARCH AGREEMENT

Provided per USPTO rules by Application Data Sheet.

REFERENCE TO SEQUENCE LISTING

Not applicable.

STATEMENT RE PRIOR DISCLOSURES

Provided per USPTO rules by Application Data Sheet.

BACKGROUND OF THE INVENTION

Field of the Invention

The invention relates to a process for fabricating complex mechanical shapes, and in particular to fabricating complex mechanical shapes using a pressure-assisted sintering technique to address problems relating to variations in specimen thickness and tooling, or densification gradients, by 3-D printing of a polymer shell model that is surrounded by and filled with sintering powder material, wherein the 3-D polymer shell model decomposes into a graphite interface layer and facilitates release of the cast, e.g. metal, metal-alloy, ceramic, etc., manufactured item.

DESCRIPTION OF THE RELATED ART

The advanced pressure assisted sintering techniques such as spark plasma sintering, which involves high pressures (up to 100 MPa) and very high temperatures (up to 2000° C.), enable the consolidation of nearly all the powders from polymers to ultra high temperature materials (such as silicon carbide) with the possibility to control the microstructure. These techniques are very useful for the fabrication of high performance materials, but their main drawback are the difficulties to generate complex shapes. In most of these processes a certain level of post-processing porosity remains, when complex shapes' fabrication is attempted, due to the high complexity of the tooling involved in the production of these shapes.

BRIEF SUMMARY OF THE INVENTION

To address this problem a general approach involving a simple tooling geometry and an internal separation interface with a complex geometry has been developed. This method named "deformed interface approach" has proven its ability to generate highly complex shape components but the generation of the internal separation interface by traditional approaches such as the imprint in powder bed or the use of a graphite foil container is still difficult and represents a new challenge.

The present approach enables the integration of the advanced complex shapes methods of 3D printing and the high quality of the material microstructures obtained by the pressure assisted sintering techniques.

In this approach, a polymer shell or skeleton with potentially a very high complex shape is generated by 3D printing (or other polymer manufacturing techniques). This polymer shell or skeleton enables a very easy generation of a complex interface in a powder bed. After a simple heat treatment, the polymer decomposition in situ generates an in bed graphite interface that preserves the initial complex geometry of the polymers. The powder assembly can then be sintered by any pressure assisted technique to full densification and the graphite interface (inert and non-sinterable) allows the release of the internal fully densified complex shape part.

In a preferred embodiment, the invention provides in a non-limiting aspect a process for producing a sintered powder manufactured item, comprising the steps:

STEP 1—performing 3D printing of a polymer shell model, of a manufactured item;
STEP 2—placing the polymer shell model in a die chamber having a tool punch;
STEP 3—loading powder sintering material into the die chamber around the polymer shell model and within any cavities of the polymer shell model;
STEP 4—vacuum or oxygen/hydrogen free atmosphere heating of the powder-encased polymer shell model to decompose the polymer shell model creating a graphite interface layer;
STEP 5—sintering of the powder assembly; and
STEP 6—releasing a sinter-powder cast manufactured item from a sacrificial outer part of sintered powder.

In another preferred embodiment, the invention provides a process wherein the polymer is selected from the group consisting of acrylonitrile butadiene styrene (ABS), polycarbonate (PC), polylactic acid (PLA), high-density polyethylene (HDPE), PC/ABS, polyphenylsulfone (PPSU), high impact polystyrene (HIPS), and combinations thereof.

In another preferred embodiment, the invention provides a process wherein the powder sintering material is selected from the group consisting of stainless steel powder, titanium alloy powder, nickel alloy powder, chromium alloy powder, and aluminum alloy powder.

In another preferred embodiment, the invention provides a process wherein the vacuum or oxygen/hydrogen free atmosphere heating is vacuum heating at a pressure of from 1-10 Torr and a temperature for sintering of metals or ceramics are between 500-1000° C. and 1000-2200° C. respectively.

In another preferred embodiment, the invention provides a process wherein the vacuum or oxygen/hydrogen free atmosphere heating is heating at a temperature for sintering of metals or ceramics are between 500-1000° C. and 1000-2200° C. respectively in an atmosphere of inert gas selected from the group consisting of nitrogen, argon, and helium, to provide an atmosphere conducive to sintering.

In another preferred embodiment, the invention provides a process wherein the powder sintering material in the die chamber around the polymer shell model is different from the powder sintering material within the cavities of the polymer shell model.

In another preferred embodiment, the invention provides a process wherein the polymer shell model is a double-layer 3D printed polymer shell model is prepared using an organic material on the inside and a ceramic material on the outside.

In another preferred embodiment, the invention provides a method consisting of:
1) generating via 3D printing or other methods a polymer shell skeleton that can be decomposed into an immersed powder (or porous media) graphite shell skeleton inner interface;
2) surrounding of this rigid or semi-rigid polymer skeleton, wherein the skeleton can have a highly complex geometry, by the powder of the material(s) to be formed, wherein the powder of the sacrificial area can be different from the powder of the main part;
3) transforming this assembly of powder/polymer into a pure powders assembly by a heat treatment under vacuum or oxygen/hydrogen free atmosphere enabling the controlled degradation of the polymer interface into a graphite (or other thermally stable products of the polymer partial degradation) powder interface that does not join the adjacent parts during the sintering allowing the post sintering releasing of the internal complex parts; and
4) after sintering, releasing the internal complex parts.

In another preferred embodiment, the invention provides a method wherein the polymer shell model or polymer skeleton can be coated by an inner ceramic powder to prevent eventual undesired carbonization reaction between the graphite powder and the main part powders.

In another preferred embodiment, the invention provides a method wherein the polymer interface degradation can be in situ incorporated in the sintering process with a simple pre-heating, which allows a one-step complex shaping process.

In another preferred embodiment, the invention provides a method wherein the polymer shell model or the polymer skeleton can be designed for a simultaneous multiple parts sintering.

In another preferred embodiment, the invention provides a method wherein the polymer is selected from the group consisting of acrylonitrile butadiene styrene (ABS), polycarbonate (PC), polylactic acid (PLA), high-density polyethylene (HDPE), PC/ABS, polyphenylsulfone (PPSU), high impact polystyrene (HIPS), and combinations thereof.

In another preferred embodiment, the invention provides a method wherein the powder sintering material is selected from the group consisting of stainless steel powder, titanium alloy powder, nickel alloy powder, chromium alloy powder, and aluminum alloy powder.

In another preferred embodiment, the invention provides a method wherein the vacuum or oxygen/hydrogen free atmosphere heating is vacuum heating at a pressure of from 1-10 Torr and a temperature for sintering of metals or ceramics are between 500-1000° C. and 1000-2200° C. respectively.

In another preferred embodiment, the invention provides a method wherein the vacuum or oxygen/hydrogen free atmosphere heating is heating at a temperature for sintering of metals or ceramics are between 500-1000° C. and 1000-2200° C. respectively in an atmosphere of inert gas selected from the group consisting of nitrogen, argon, and helium, to provide an atmosphere conducive to sintering.

In another preferred embodiment, the invention provides a method wherein the powder sintering material in the die chamber around the polymer shell model is different from the powder sintering material within the cavities of the polymer shell model.

In another preferred embodiment, the invention provides a method wherein the polymer shell model is a double-layer 3D printed polymer shell model is prepared using an organic material on the inside and a ceramic material on the outside.

In another preferred embodiment, the invention provides in a non-limiting aspect wherein the polymer interface degradation can be in situ incorporated in the sintering process with a simple pre-heating, which allows a one-step complex shaping process.

In another preferred embodiment, the invention provides in a non-limiting aspect wherein the polymer shell model or the polymer skeleton can be designed for a simultaneous multiple parts sintering.

BRIEF DESCRIPTION OF THE SEVERAL VIEWS OF DRAWING

FIG. 2 is a descriptive process flowchart showing a non-limiting preferred embodiment of the STEPS of the inventive method.

FIG. 3 is a series of photographic images showing a non-limiting embodiment of the method of the invention illustrating manufacture of a twisted gear manufactured item.

DETAILED DESCRIPTION OF THE INVENTION

Figure 1:
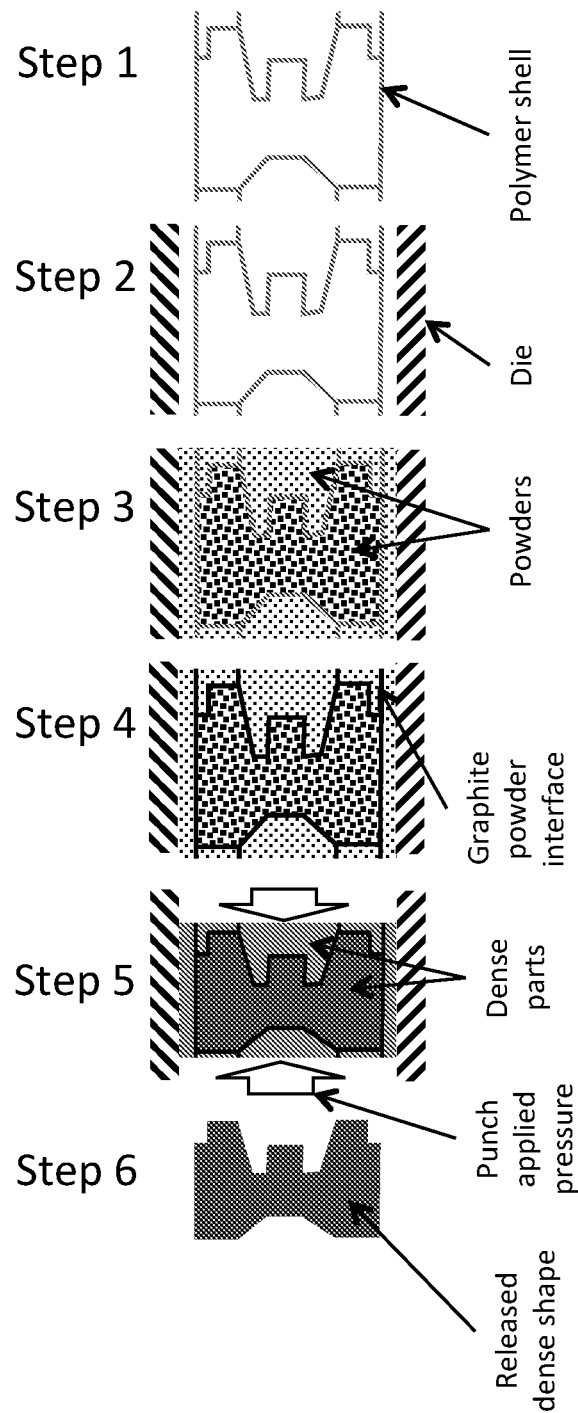
FIG. 1 is an illustrated process flowchart showing a non-limiting preferred embodiment of the STEPS of the inventive method.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Rather, these embodiments are provided so that this disclosure will be thorough and complete, and will fully convey the scope of the invention to those skilled in the art. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal subparts. As will be understood by one skilled in the art, a range includes each individual member.

Advantages

Advantages of this approach are: 1) the ability to generate fully dense very high complex shapes thank to the use of the process like 3D printing, 2) the ability to fabricate high performance materials, using consolidation techniques like SPS, HP or HIP and 3) the ability to generate multiple parts by sintering them simultaneously thereby considerably increasing the productivity of the method.

The present approach is not limited to specific materials, not limited to specific shapes, and enables high performance properties thanks to the potential combination of 3D printing and SPS, and highly productive due to its intrinsic concept.

In one aspect, novelty lies in the in-situ generation of a graphite separation interface immersed in the consolidated powder volume. The separation interface is obtained by partial degradation of a polymer (organic) shell into a graphite powder interface keeping the complexity of the previous polymer shape. This graphite powder interface is highly deformable and allows the full sintering of powder assembly containing internal highly complex shapes that can be separated after consolidation.

The classical "deformed interface approach" allows the fabrication of fully dense high complex shapes by pressure assisted sintering using inert (non-sintered) separation interfaces immersed in the consolidated powder volume. The previously known way to accomplish this is a spray deposition of the inert powder at an imprint in a powder bed or using a semi-rigid graphite skeleton. These known approaches of powder bed immersed interfaces are very difficult and significantly limit the complexity of the shapes that can be sintered.

In contrast, the invention of a partially degradable polymer interface method is very simple. This method uses complex shapes polymer shells or skeletons that can be obtained by 3D printing, stereolithography or other polymer forming methods. The complex shape polymer skeleton can be used directly in the powder bed to be sintered. In traditional vacuum or oxygen/hydrogen-free atmosphere heat treatments, the polymer will natural degrade into a graphite powder that has a high potential to separate the sintered parts.

This method is very simple to use, and, combined with 3D printing and advanced sintering techniques like spark plasma sintering, it allows the fabrication of nearly all shapes of all materials.

This method is also highly adaptable to more traditional pressure assisted sintering techniques such as hot pressing or hot isostatic pressing. Additionally, this method allows to easily design multiple parts simultaneously sintered which provides a drastic improvement of the traditional pressure assisted sintering techniques productivity.

The non-obviousness of this approach lies in the idea of the in situ polymer interface degradation. Polymers exhibit drastically different behavior at high temperatures compared to metals or ceramics. The temperature of sintering of polymers is around 100° C. while the temperatures involved in the sintering of metals or ceramics are between 500-1000° C. and 1000-2200° C. respectively. The ideas of generating an assembly for a mutual sintering of high temperature powders like metals or ceramics together with polymers is not obvious. The original concept of the "deformed interface approach" assumes the direct usage of very high temperature and stable materials like graphite, boron nitride, silicon carbide, alumina, etc., to generate the inert separation interface and ensure that the interface material will not consolidate to avoid the adhesion of all the parts, this way promoting the release of a complex shape component.

The core of the present process is to take advantage of the polymer degradation in vacuum or oxygen/hydrogen-free atmosphere into graphite, a material that has no melting point and can be heated to its sublimation point of 3642° C. The polymer skeleton transformation into a graphite skeleton during the process preserving the complexity of the interface constitutes the originality and the non-obviousness of this approach.

In a preferred embodiment, the polymer is acrylonitrile butadiene styrene (ABS). Acrylonitrile butadiene styrene (ABS) has the chemical formula (C8H8)x·(C4H6)y·(C3H3N)z). The ABS glass transition temperature is approximately 105° C. (221° F.), although ABS is amorphous and therefore has no true melting point.

When the polymer powder is extruded into a filament, ABS can be used in 3D printing.

A new net shaping method associated with the class of pressure assisted sintering techniques such as Spark Plasma Sintering (SPS)/Field-Assisted Sintering Techniques (FAST), Hot pressing (HP), or Hot Isostatic Pressing (HIP), and based on the "deformed interface approach", has been developed.

The challenge of the fabrication of complex shape objects by pressure assisted sintering is to address the problem of densification gradients generated by the specimen thickness variations and/or the tooling. For this purpose, different complex shape punch-based and sacrificial materials approaches appear. Among these approaches, an outstanding method which can be named "deformed interfaces approach" has been put forward. This approach allows the mutual sintering of an internal complex shape and of a sacrificial material that together form an external simple shape assembly easy to fully consolidate. An internal interface with a complex geometry is used to allow the post-sintering separation of the sacrificial parts from the main complex shape specimen. This approach is all shapes inclusive and, combined with sintering techniques, such as SPS, can be applied to nearly all materials. This approach has already proved the potential for high complex shaping, but the traditional methods to generate the internal interface are still very difficult to realize. These traditional methods use powder bed imprint or graphite foil container, which limits the achievement of very complex shapes.

The invention provides a method that efficiently facilitates the generation of the separation interface for the fabrication of simple to very high complex shapes. This method is ideally combinable with 3D printing technologies or polymer forming methods (extrusion blow molding, vacuum forming of thermoplastics, etc.)

The main principle of the new method consists in: 1) generation of an organic polymer shell or skeleton by 3D printing or other methods, 2) surrounding of this rigid or semi-rigid polymer skeleton (that can have a highly complex geometry) by the powder of the material(s) to be formed (the powder of the sacrificial area can be different from the powder of the main part), 3) transformation of this assembly of powder/polymer into a pure powders assembly by a heat treatment under vacuum or oxygen/hydrogen free atmosphere enabling the controlled degradation of the organic polymer interface into a graphite powder interface that does not sinter and 4) facilitation of the post-sintering release of the internal complex parts.

In one preferred embodiment, there is an additional step of coating the polymer skeleton with an inner ceramic powder to prevent eventual undesired carbonization reaction between the graphite powder and the main part powders.

The polymer interface degradation can be in situ incorporated in the sintering process with a simple pre-heating, which allows a one-step complex shaping process.

The polymer skeleton can be designed for a simultaneous multiple parts sintering.

The term "3D printing" refers to additive manufacturing generally. Materials contemplated as within the scope of the invention include acrylonitrile butadiene styrene (ABS), polycarbonate (PC), polylactic acid (PLA), high-density polyethylene (HDPE), PC/ABS, polyphenylsulfone (PPSU) and high impact polystyrene (HIPS).

The term "organic polymer shell", "polymer shell", or "polymer skeleton" refers to a hollow three-dimensional object made using additive manufacturing, where the organic polymer shell has one or more empty interior cavity(s), has an exterior surface, and the shell defines a model shape for obtaining a sinter-cast item.

The term "organic" refers to a carbon based material that decomposes to graphite or similar non-sinterable graphite-containing allotrope of carbon under heat in a vacuum or oxygen free (or hydrogen free) atmosphere.

The term "non-sinterable" for graphite or other carbon forms derived from the organic polymer means that the organic polymer will degrade to graphite or similar graphite-containing allotrope of carbon, and also refers to the fact that graphite has no melting point and can be heated to its sublimation point of 3642° C.

The term "graphite" refers to a stable allotrope of carbon composed of sheets of graphene, and also includes compositions composed primarily of graphite (>90%) but with some impurities.

The term "vacuum heating" refers to having a low-pressure condition during heating such as is provided by a vacuum furnace. A vacuum furnace is a type of furnace in which the product in the furnace is surrounded by a vacuum during processing. The absence of air or other gases prevents oxidation, prevents heat loss from the product through convection, and removes a source of contamination. This enables the furnace to heat materials (typically metals and ceramics) to temperatures as high as 3,000° C. (5,432° F.).

Characteristics of a vacuum furnace are: temp 800-3,000° C. (1,500-5,400° F.), vacuum levels as low as 10e−11 Torr. (1 Torr=1.333 millibar, 760 Torr=1 atm) but preferably 1-10 Torr. In vacuum heating, an inert gas, such as Argon, may be used to quickly cool the treated metals back to non-metallurgical levels (below 400° F. [200° C.]) after the desired process in the furnace. This inert gas step may include pressurizing to two times atmosphere or more, re-circulating the inert gas from the hot zone area to a heat exchanger to remove heat.

The term "heating in an oxygen free and/or hydrogen free atmosphere" refers to process parameters of using an inert gas such as argon, nitrogen, or helium during the heating process. The process may include using a hydrogen stream to remove oxygen during the heating process.

In preferred embodiments, 3D printing is powder bed fusion which is the selective fusing of materials in a granular bed. The technique fuses parts of the layer and then moves upward in the working area, adding another layer of granules and repeating the process until the piece has built up. This process uses the unfused media to support overhangs and thin walls in the part being produced, which reduces the need for temporary auxiliary supports for the piece.

In selective heat sintering, a thermal printhead applies heat to layers of powdered thermoplastic; when a layer is finished, the powder bed moves down, and an automated roller adds a new layer of material which is sintered to form the next cross-section of the model; using a less intense thermal printhead instead of a laser, makes this a cheaper solution than using lasers, and can be scaled down to desktop sizes.

Laser sintering techniques with both metals, ceramics, and polymers include selective laser sintering (SLS), electron beam melting (EBM), direct metal laser sintering (DMLS), and selective laser melting (SLM).

Preferred polymers include polyamides (PA), glass fiber polyamide (PA-GF), Rigid GF, polyether ether ketone (PEEK), polystyrene (PS), Alumide, Carbonmide, and elastomers.

Selective Laser Sintering (SLS) involves the use of a high power laser (for example, a carbon dioxide laser) to fuse plastic powders into a mass that has a desired three-dimensional shape. The laser selectively fuses powdered material by scanning cross-sections generated from a 3-D digital description of the part (for example from a CAD file or scan data) on the surface of a powder bed. After each cross-section is scanned, the powder bed is lowered by one layer thickness, a new layer of material is applied on top, and the process is repeated until the part is completed.

Selective laser melting (SLM) does not use sintering for the fusion of powder granules but instead completely melts the powder using a high-energy laser to create fully dense materials in a layer-wise method that has mechanical properties similar to those of conventional manufactured metals.

Electron beam melting (EBM) is a similar type of additive manufacturing technology for metal parts (e.g. titanium alloys). EBM manufactures parts by melting metal powder layer by layer with an electron beam in a high vacuum. Unlike metal sintering techniques that operate below melting point, EBM parts are void-free.

Direct metal laser sintering (DMLS) is a similar type of additive manufacturing technology for metal parts. The DMLS process starts by slicing the 3D CAD file data into layers, usually from 20 to 100 micrometers thick, creating a 2D image of each layer; this file format is the industry standard .stl file used on most layer-based 3D printing or stereolithography technologies. This file is then loaded into a file preparation software package that assigns parameters, values and physical supports that allow the file to be interpreted and built by different types of additive manufacturing machines. Thin layers of atomized fine metal powder are evenly distributed using a coating mechanism onto a substrate plate, usually metal, that is fastened to an indexing table that moves in the vertical (Z) axis. This takes place inside a chamber containing a tightly controlled atmosphere of inert gas, either argon or nitrogen at oxygen levels below 500 parts per million. Once each layer has been distributed, each 2D slice of the part geometry is fused by selectively melting the powder. This is accomplished with a high-power laser beam, usually an ytterbium fiber laser with hundreds of watts. The laser beam is directed in the X and Y directions with two high frequency scanning mirrors. The laser energy is intense enough to permit full melting (welding) of the particles to form solid metal. The process is repeated layer after layer until the part is complete. DMLS machines use a high-powered 200 watt Yb-fiber optic laser. Inside the build chamber area, there is a material dispensing platform and a build platform along with a recoater blade used to move new powder over the build platform. The technology fuses metal powder into a solid part by melting it locally using the focused laser beam. Parts are built up additively layer by layer, typically using layers 20 micrometers thick.

Materials used in the DMLS process include copper, aluminum, stainless steel, tool steel, cobalt chrome, titanium and tungsten. Alloys used in the DMLS process include 17-4 and 15-5 stainless steel, maraging steel, cobalt chromium, inconel 625 and 718, aluminum AlSi10Mg, and titanium Ti6Al4V.

Sintering Powders

Powders used in the present invention include metals, ceramics, polymers, and combinations.

Metal powders include stainless steel powders and alloy powders.

Stainless Steel Powders

Stainless steel powders include austenitic stainless steel, ferritic stainless steel, martensitic stainless steel, nitrogen-strengthened stainless steel, titanium-alloy stainless steel, duplex stainless steel, super-duplex stainless steel, and heat-resistant steel.

Alloy Powders

Alloy powders include binary alloy powders, cobalt alloy powders, copper alloy powders, diamond catalyst alloy powders, high-speed steel powders, low-alloy steel powders, master alloy powders, Metal-CrAlY alloy powders (Fe—, Ni—, Cr—, Co—, —), nickel alloy powders, super alloy powders, titanium alloy powders (—Ni, —Al, —Cu, —Sn, —Pd, —Co, —Fe, —Cr, —Mn, —Si, —Mo, —V, —Zr, and —Al—V), brass, bronze, Nitinol, exotic high temperature alloy powders useful on spacecraft, engine parts, and drilling machinery, and tool steel powders.

Additional alloying materials that are admixed with metal-based particles of the kind described above are those known in the metallurgical arts to enhance the strength, hardenability, electromagnetic properties, or other desirable properties of the final sintered product. Steel-producing elements are among the best known of these materials.

Specific examples of alloying materials include, but are not limited to, elemental molybdenum, manganese, chromium, silicon, copper, nickel, tin, vanadium, columbium (niobium), hafnium, metallurgical carbon (graphite), osmium, phosphorus, aluminum, sulfur, tantalum, and combinations thereof. Other suitable alloying materials are binary alloys of copper with tin or phosphorus; ferro-alloys of manganese, chromium, boron, phosphorus, or silicon; low-melting ternary and quaternary eutectics of carbon and two or three of iron, vanadium, manganese, chromium, and molybdenum; carbides of tungsten or silicon; silicon nitride; and sulfides of manganese or molybdenum.

Alloying materials are used in the composition in the form of particles that are generally of finer size than the particles of metal-based material with which they are admixed. The alloying-element particles generally have a weight average particle size below about 100 microns, preferably below about 75 microns, more preferably below about 30 microns, and most preferably in the range of about 5-20 microns. The amount of alloying material present in the composition will depend on the properties desired of the final sintered part. Generally the amount will be minor, up to about 5% by weight of the total powder weight, although as much as 10-15% by weight can be present for certain specialized powders. A preferred range suitable for most applications is about 0.25-4.0% by weight.

Ceramic Powders

Ceramic powder used in this invention can be prepared from various types of material, but it is desirable to use a material which has as its principal ingredient at least one substance selected from carbides, nitrides, oxides and their compounds. The carbides usable for this purpose include, for example, silicon carbide, boron carbide, aluminum carbide, tungsten carbide, titanium carbide, tantalum carbide and zirconium carbide. As the nitrides, silicon nitride, boron nitride, aluminum nitride, titanium nitride, zirconium nitride and the like may be used.

Exemplary of the oxides usable in this invention are steatite, forsterite, alumina, zircon, beryllia, magnesia, mullite, cordierite, aluminum titanate, and zirconia.

The ceramic powder can have an average particle size from 2-200 micron (um).

Additional ceramics can include glass powders including glass composites with alumina (Al$_2$O$_3$), Glass with carbon fibers and alumina, Glass with ZnO, B2O3, Na2O, Al2O3, SiO2, CaO glass, Ca-, Sr- or Ba-Glass (Si2Al2O8), Boron glass, MgO glass, Glass with polymer fibers, Glass with metal fibers, Glass with metal fibers and graphite fibers, and mixtures and composites thereof.

Additionally, it may be preferable to incorporate lubricants, dispersants, carbonaceous sintering assistants, densifying assistants such as beryllium, boron, or aluminum, flowability and/or viscosity assistants, binders, and molding assistants including waxes and stearates.

Polymer Powders

Semicrystalline polymers can also be used in additive manufacturing. Examples of polymer powders contemplated within the invention include polyamide (PA), poly ethyl ethyl ketone (PEEK), poly aryl ethyl ketone (PAEK), poly ether ketone ketone (PEKK), and so forth. Additionally, polymer powders doped with carbon fiber or metal fibers are contemplated as within the scope of the invention.

Vacuum Heating or Oxygen/Hydrogen Free Heating

As stated, the term "vacuum or oxygen/hydrogen free atmosphere heating" refers to vacuum heating or oxygen/hydrogen free atmosphere heating. Vacuum heating includes a range of partial pressures from 1 to 10 Torr (133.322-1333.22 Pa). Heating temperatures depend on the material being sintered. However, heating can also include a preliminary step to remove water, e.g. 100-250 degrees Celsius, and to remove hydrogen, e.g. 400-600 degrees Celsius, before subjecting a sintering temperature, e.g. sintering of metals or ceramics are between 500-1000° C. and 1000-2200° C. respectively. Oxygen/hydrogen free atmosphere heating includes using an inert gas such as nitrogen, argon, and helium, to provide an atmosphere conducive to sintering.

In one exemplary process, a suitable inert gas-hydrogen atmosphere is produced by 1) generating an impure inert gas stream containing about 0.1 to 5% residual oxygen by a known non-cryogenic air separation technique, 2) mixing the impure inert gas stream with a pre-determined amount of hydrogen, 3) converting residual oxygen to moisture by reaction with hydrogen in a catalytic, e.g. platinum, reactor, 4) cooling the reactor effluent stream, and 5) removing moisture from it in a regenerative sorbent dryer. The inert gas-hydrogen atmosphere containing less than 100 ppm moisture and 10 ppm residual oxygen and more than 0.1% hydrogen can be used "as-is" for annealing, hardening, brazing, and sintering ferrous and non-ferrous metals and alloys in a single furnace or multiple furnaces without requiring any additional downstream gas blending equipment.

Organic Materials for Polymer Shell

The term "polymer skeleton" or "polymer shell" and graphite refer to the organic material used in the 3D printing process or additive manufacturing process to make the model, and which materials is transformed into graphite shell as part of the inventive process.

As stated, preferred organic materials contemplated as within the scope of the invention include acrylonitrile butadiene styrene (ABS), polycarbonate (PC), polylactic acid (PLA), high-density polyethylene (HDPE), PC/ABS, polyphenylsulfone (PPSU) and high impact polystyrene (HIPS).

Additional examples of usable organic compound are those mentioned below. There can be used, for example, natural organic polymers such as starch, cellulose, protein, collagen, alginic acid, dammar, kovar, rosin, gutta-percha and natural rubber; semisynthetic polymers such as cellulose resin, cellulose acetate, cellulose nitrate, cellulose acetate butyrate, casein plastic and soybean protein plastic; and synthetic polymers such as thermosetting reins such as phenol resin, urea resin, melamine resin, benzoguanamine resin, epoxy resin, diallyl phthalate resin, unsaturated polyester resin, bisphenol A type epoxy resin, Novolac type epoxy resin, polyfunctional epoxy resin, alicyclic epoxy resin, alkyd resin and urethane resin, thermoplastic resins such as polyester resins (polyethylene terephthalate (PET) resin, polytrimethylene terephthalate resin, polybutylene terephthalate resin, polyethylene naphthalate resin, polybutylene naphthalate resin and the like), vinyl chloride resin, polyethylene, polypropylene and polystyrene, synthetic rubbers such as polyisoprene and butadiene, synthetic fibers such as nylon, vinylon, acrylic fiber and rayon, and other materials such as polyvinyl acetate, ABS resin, AS resin, acrylic resin, polyacetal, polyimide, polycarbonate, modified polyphenylene ether (PPE), polyarylate, polysulfone, polyphenylene sulfide, polyether ether ketone, fluorine-containing resin, polyamide imide, and silicon resin.

Vibrating

Vibrating may be necessary to ensure complete filling or coverage of the powder(s) in and around the polymer shell model. According to this invention, the powder assembly may optionally be vibrated if necessary. Vibration of the powder assembly is helpful for preventing the agglomeration of the powders and to ensure uniform dispersion of said materials.

The vibration given to the powder assembly is preferably of a frequency within the range from 1 to 400 Hz, to maintain uniform dispersion of the powder assembly materials or to modify the viscosity.

To vibrate the suspension, it is advantageous to employ at least one of the following types of vibration: one given by a mechanical means, one given by an electromagnetic means and one given by a pulsating pump.

Figures

Referring now to the drawings, FIG. 1 is an illustrated process flowchart showing a non-limiting preferred embodiment of the STEPS of the inventive method. STEP 1 describes performing 3D printing of a polymer shell model, e.g. ABS shell model, of a manufactured item. STEP 2 describes placing the polymer shell model in a die chamber having a tool punch. STEP 3 describes loading powder sintering material into the die chamber around the polymer shell model and within any cavities of the polymer shell model. STEP 4 describes heating under vacuum or oxygen/hydrogen free atmosphere, the powder-encased polymer shell model to decompose the polymer shell model creating a graphite interface layer. STEP 5 describe the sintering of the powder assembly. STEP 6 describes releasing a sinter-powder cast manufactured item from a sacrificial outer part of sintered powder.

FIG. 2 also describes the process and elaborates on the details of the process shown in FIG. 1

FIG. 3 is a series of photographic images showing a non-limiting embodiment of the method of the invention illustrating manufacture of a twisted gear manufactured item. STEP 1 describes performing 3D printing of a polymer shell model, e.g. ABS shell model, of a manufactured twisted gear having a complex shape. STEP 2 describes placing the polymer shell model of the twisted gear in a die chamber having a tool punch. STEP 3 describes loading powder sintering material into the die chamber around the polymer shell model of the twisted gear and within any cavities of the polymer shell model of the twisted gear. STEP 4/5 describes sintering the powder-encased polymer shell model of the twisted gear to decompose the polymer shell model of the twisted gear creating a graphite interface layer. STEP 6 describes releasing a sinter-powder cast manufactured item of the twisted gear from a sacrificial outer part of sintered powder.

The approach is very easy to establish as it uses inexpensive 3D printing technologies or traditional polymer manufacturing techniques. Both above-mentioned technologies are presently mature, productive and already well established at industrial level.

Concerning the sintering, different options are applicable. The SPS technology offers the capability of sintering of nearly all materials, and, at the same time, the rapid heating and cooling enable the fabrication of high performance materials. This technology is still poorly employed at industrial level. The main reason for this is that traditional powder processing technologies are either low productive or their utilization for the fabrication of complex shapes is difficult. The present approach addresses both of these challenges and represents a real-world concrete solution to bring this technology to the industrial level of implementation.

This method is also highly adaptable to more traditional processes like hot pressing, which is very close to the SPS technology, and where the only difference is in the heating that is external and is provided by heating elements or an inductive coil.

This method can also be applied using the hot isostatic pressing where the pressure is uniformly provided by a high pressurized gas to the surface of the complex shape sample. Despite the HIP approach enables the use of initial complex shape samples, a recurrent problem of sample distortions due to the thick metallic sealant containers is frequently reported. The present approach represents then a great potential by using a simple container geometry (less sensible to distortions) with internal complex geometry interfaces. This combined "deformed interface approach" and simple shape container usage provide a good potential for the fabrication of high complex shapes by HIP without distortions.

The method provided is therefore highly adaptable to a large variety of well-established techniques and provides a significant improvement of their productivity and ability to generate highly complex shapes while maintaining the simplicity of the fabrication process.

As shown in FIG. 3, an initial prototype illustrates production of a complex twisted stainless-steel gear using a ABS 3D printed polymer skeleton and SPS consolidation. The 30 mm sample exhibits a near net shape. The easiness of the assembly, decomposition under vacuum and the post sintering part release of the complex shape has been proven.

The invention includes manufacture via a SPS process of mechanical parts of complex shape. It is understood that the present invention is not limited by these particular embodiments and that other embodiments can be perfectly implemented. Thus, and according to alternative embodiments, the invention relates to the manufacture of complex parts which can have a great diversity of shape, with possible adaptations of the manufacturing method depending on the degree of complexity of these forms. The shape complexity results from the thickness variations of the latter in the direction of compression. This complexity increases for parts exhibiting:

A flat base with differences in heights and scraps (easy to unmold)
A non-planar base with differences in heights and scraps (easy to unmold)
A flat base with differences in height but without stripping (requires to segment the sacrificial part)
A non-planar base without skin (requires to segment the sacrificial part)
A hollow shape (two or more parts requiring an additional assembly and joining step).

Similarly, the densification step is not limited to the SPS, but also relates to forging, hot pressing, hot isostatic pressing, or any other known method of consolidation and/or creep of pulverulent materials and/or porous materials.

It is important to understand that the invention may, optionally, in some embodiments include products of the polymers interfaces that are not necessarily graphite but which are still inert to the sintering.

The only properties which are required from the partially degraded interface is to not join the adjacent parts and to provide for post sintering releasing.

In one preferred embodiment, a powder which does not sinter is the best. Since ABS will degrade to graphite, and graphite has no melting point and can be heated to its sublimation point of 3642° C.

In another preferred embodiment, the interface powder is sintered or consolidated during the thermal process but the intrinsic fragile nature still allows an easy removal of the parts.

Example—ABS Shell and Stainless

An initial prototype illustrates production of a complex twisted stainless-steel gear. An ABS 3D printed polymer skeleton is used to make a polymer shell model. A stainless steel powder is packed around the outside and inside the polymer shell. The powder assembly is heated to 600-1000 degrees Celsius in an argon or nitrogen atmosphere to decompose the ABS into a graphite shell. SPS consolidation is performed on the powder assembly to densify the powder into a solid unit comprised of a cast item wrapped in a graphite layer surrounded by a sacrificial outer block. The cast item is released from the sacrificial outer block. The 30 mm sample exhibits a near net shape. The easiness of the assembly, decomposition under vacuum and the post sintering part release of the complex shape illustrates the advantages of the present inventive subject matter.

Example—Organic Shell and Metal

A 3D printed polymer skeleton (polymer shell model) is prepared using an organic material having a particle size of 20-200 micron (um). The polymer shell model is placed in a die chamber having a tool punch. A metal powder material having a particle size from 20-100 micron (um) is used to fill the interior of the polymer shell model and the same metal powder material is used to pack around the outside of the polymer shell model, exterior powder, within the die chamber. The loaded die chamber is heated under vacuum or under oxygen/hydrogen free atmosphere conditions at a temperature, e.g. 600-1000 degrees Celsius, to decompose the organic material and create a graphite interface layer in the shape of the 3D printed polymer shell model. The powder assembly is sintered by applying appropriate technique(s), e.g. SLS (laser), to densify the interior powder into the sinter-powder cast manufactured item, and to densify the exterior powder into a sacrificial part. The cast item is released from the sacrificial part since the cast item and the sacrificial part are separatable because of the graphite interface layer in the shape of the 3D printed polymer shell model.

Example—Organic Shell and Stainless Steel

A 3D printed polymer skeleton (polymer shell model) is prepared using an organic material selected from acrylonitrile butadiene styrene (ABS), polycarbonate (PC), polylactic acid (PLA), high-density polyethylene (HDPE), PC/ABS, polyphenylsulfone (PPSU) and high impact polystyrene (HIPS). The polymer shell model is placed in a die chamber having a tool punch. A stainless steel powder material having a particle size from 20-100 micron (um) is used to fill the interior of the polymer shell model and the same metal powder material is used to pack around the outside of the polymer shell model, exterior powder, within the die chamber. The loaded die chamber is heated under vacuum or under oxygen/hydrogen free atmosphere conditions at a temperature, e.g. 600-1000 degrees Celsius, to decompose the organic material and create a graphite interface layer in the shape of the 3D printed polymer shell model. The powder assembly is sintered by applying appropriate technique(s), e.g. SLS (laser), to densify the interior powder into the sinter-powder cast manufactured item, and to densify the exterior powder into a sacrificial part. The cast item is released from the sacrificial part since the cast item and the sacrificial part are separatable because of the graphite interface layer in the shape of the 3D printed polymer shell model.

Example—Organic Shell and Titanium alloy

A 3D printed polymer skeleton (polymer shell model) is prepared using an organic material selected from acrylonitrile butadiene styrene (ABS), polycarbonate (PC), polylactic acid (PLA), high-density polyethylene (HDPE), PC/ABS, polyphenylsulfone (PPSU) and high impact polystyrene (HIPS). The polymer shell model is placed in a die chamber having a tool punch. A Titanium alloy powder material having a particle size from 20-100 micron (um) is used to fill the interior of the polymer shell model and the same metal powder material is used to pack around the outside of the polymer shell model, exterior powder, within the die chamber. The loaded die chamber is heated under vacuum or under oxygen/hydrogen free atmosphere conditions at a temperature, e.g. 600-1000 degrees Celsius, to decompose the organic material and create a graphite interface layer in the shape of the 3D printed polymer shell model. The powder assembly is sintered by applying appropriate technique(s), e.g. SLS (laser), to densify the interior powder into the sinter-powder cast manufactured item, and to densify the exterior powder into a sacrificial part. The cast item is released from the sacrificial part since the cast item and the sacrificial part are separatable because of the graphite interface layer in the shape of the 3D printed polymer shell model.

Example—Organic Shell and Chromium alloy

A 3D printed polymer skeleton (polymer shell model) is prepared using an organic material selected from acrylonitrile butadiene styrene (ABS), polycarbonate (PC), polylactic acid (PLA), high-density polyethylene (HDPE), PC/ABS, polyphenylsulfone (PPSU) and high impact polystyrene (HIPS). The polymer shell model is placed in a die chamber having a tool punch. A Chromium alloy powder material having a particle size from 20-100 micron (um) is used to fill the interior of the polymer shell model and the same metal powder material is used to pack around the outside of the polymer shell model, exterior powder, within the die chamber. The loaded die chamber is heated under vacuum or under oxygen/hydrogen free atmosphere conditions at a temperature, e.g. 600-1000 degrees Celsius, to decompose the organic material and create a graphite interface layer in the shape of the 3D printed polymer shell model. The powder assembly is sintered by applying appropriate technique(s), e.g. SLS (laser), to densify the interior powder into the sinter-powder cast manufactured item, and to densify the exterior powder into a sacrificial part. The cast item is released from the sacrificial part since the cast item and the sacrificial part are separatable because of the graphite interface layer in the shape of the 3D printed polymer shell model.

Example—Organic Shell and Nickel Alloy

A 3D printed polymer skeleton (polymer shell model) is prepared using an organic material selected from acrylonitrile butadiene styrene (ABS), polycarbonate (PC), polylactic acid (PLA), high-density polyethylene (HDPE), PC/ABS, polyphenylsulfone (PPSU) and high impact polystyrene (HIPS). The polymer shell model is placed in a die chamber having a tool punch. A Nickel alloy powder material having a particle size from 20-100 micron (um) is used to fill the interior of the polymer shell model and the same metal powder material is used to pack around the outside of the polymer shell model, exterior powder, within the die chamber. The loaded die chamber is heated under vacuum or under oxygen/hydrogen free atmosphere conditions at a temperature, e.g. 600-1000 degrees Celsius, to decompose the organic material and create a graphite interface layer in the shape of the 3D printed polymer shell model. The powder assembly is sintered by applying appropriate technique(s), e.g. SLS (laser), to densify the interior powder into the sinter-powder cast manufactured item, and to densify the exterior powder into a sacrificial part. The cast item is released from the sacrificial part since the cast item and the sacrificial part are separatable because of the graphite interface layer in the shape of the 3D printed polymer shell model.

Example—Organic Shell and Aluminum Alloy

A 3D printed polymer skeleton (polymer shell model) is prepared using an organic material selected from acrylonitrile butadiene styrene (ABS), polycarbonate (PC), polylactic acid (PLA), high-density polyethylene (HDPE), PC/ABS, polyphenylsulfone (PPSU) and high impact polystyrene (HIPS). The polymer shell model is placed in a die chamber having a tool punch. An Aluminum alloy powder material having a particle size from 20-100 micron (um) is used to fill the interior of the polymer shell model and the same metal powder material is used to pack around the outside of the polymer shell model, exterior powder, within the die chamber. The loaded die chamber is heated under vacuum or under oxygen/hydrogen free atmosphere conditions at a temperature, e.g. 600-1000 degrees Celsius, to decompose the organic material and create a graphite interface layer in the shape of the 3D printed polymer shell model. The powder assembly is sintered by applying appropriate technique(s), e.g. SLS (laser), to densify the interior powder into the sinter-powder cast manufactured item, and to densify the exterior powder into a sacrificial part. The cast item is released from the sacrificial part since the cast item and the sacrificial part are separatable because of the graphite interface layer in the shape of the 3D printed polymer shell model.

Example—Mixed Metal Cast Item and Sacrificial Part

A 3D printed polymer skeleton (polymer shell model) is prepared using an organic material selected from acrylonitrile butadiene styrene (ABS), polycarbonate (PC), polylactic acid (PLA), high-density polyethylene (HDPE), PC/ABS, polyphenylsulfone (PPSU) and high impact polystyrene (HIPS). The polymer shell model is placed in a die chamber having a tool punch. An metal alloy powder material having a particle size from 20-100 micron (um) is used to fill the interior of the polymer shell model and a different metal powder material is used to pack around the outside of the polymer shell model, exterior powder, within the die chamber. The loaded die chamber is heated under vacuum or under oxygen/hydrogen free atmosphere conditions at a temperature, e.g. 600-1000 degrees Celsius, to decompose the organic material and create a graphite interface layer in the shape of the 3D printed polymer shell model. The powder assembly is sintered by applying appropriate technique(s), e.g. SLS (laser), to densify the interior powder into the sinter-powder cast manufactured item, and to densify the exterior powder into a sacrificial part. The cast item is released from the sacrificial part since the cast item and the sacrificial part are separatable because of the graphite interface layer in the shape of the 3D printed polymer shell model.

Example—Mixed Metal Cast Item and Ceramic Sacrificial Part

A 3D printed polymer skeleton (polymer shell model) is prepared using an organic material selected from acrylonitrile butadiene styrene (ABS), polycarbonate (PC), polylactic acid (PLA), high-density polyethylene (HDPE), PC/ABS, polyphenylsulfone (PPSU) and high impact polystyrene (HIPS). The polymer shell model is placed in a die chamber having a tool punch. An metal alloy powder material is used to fill the interior of the polymer shell model and a ceramic powder material is used to pack around the outside of the polymer shell model, exterior powder, within the die chamber. The loaded die chamber is heated under vacuum or under oxygen/hydrogen free atmosphere conditions at a temperature, e.g. 600-1000 degrees Celsius, to decompose the organic material and create a graphite interface layer in the shape of the 3D printed polymer shell model. The powder assembly is sintered by applying appropriate technique(s), e.g. SLS (laser), to densify the interior powder into the sinter-powder cast manufactured item, and to densify the exterior powder into a sacrificial part. The cast item is released from the sacrificial part since the cast item and the sacrificial part are separatable because of the graphite interface layer in the shape of the 3D printed polymer shell model.

Example—Combined Graphite and Ceramic Shell

A double-layer 3D printed polymer skeleton (polymer shell model) is prepared using an organic material on the inside and a ceramic material on the outside. The double-layer polymer shell model is placed in a die chamber having a tool punch. An metal alloy powder material is used to fill the interior of the double-layer polymer shell model and a second powder material (same or different) is used to pack around the outside of the double-layer polymer shell model, exterior powder, within the die chamber. The loaded die chamber is heated under vacuum or under oxygen/hydrogen free atmosphere conditions at a temperature, e.g. 600-1000 degrees Celsius, to decompose the organic material and sinter the ceramic material to create a double-layer graphite interface inner with a ceramic outer in the shape of the 3D printed polymer shell model. The remaining powder assembly is sintered by applying appropriate technique(s), e.g. SLS (laser), to densify the interior powder into the sinter-powder cast manufactured item, and to densify the exterior powder into a sacrificial part. The cast item is released from the sacrificial part since the cast item and the sacrificial part are separatable because of the double-layer graphite interface inner and ceramic outer in the shape of the 3D printed polymer shell model.

Example—Dual Metal Cast Item

A 3D printed polymer skeleton (polymer shell model) is prepared using an organic material. The polymer shell model is placed in a die chamber having a tool punch. A first metal or metal alloy powder material is used to partially fill the interior of the polymer shell model and a second metal or metal alloy powder material is used to complete the filling of the interior cavity of the polymer shell model. A third metal or metal alloy powder material (same or different) is used to pack around the outside of the polymer shell model within the die chamber. The loaded die chamber is heated under vacuum or under oxygen/hydrogen free atmosphere conditions at a temperature, e.g. 600-1000 degrees Celsius, to decompose the organic material to create a graphite interface inner in the shape of the 3D printed polymer shell model. The remaining dual-powder powder assembly is sintered by applying appropriate technique(s), e.g. SLS (laser), to densify both of the interior powders into the dual metal sinter-powder cast manufactured item, and to densify the exterior powder into a sacrificial part. The dual metal cast item is released from the sacrificial part since the dual metal cast item and the sacrificial part are separatable because of the double-layer graphite interface inner in the shape of the 3D printed polymer shell model.

Example—Dual Metal-Ceramic Cast Item

A 3D printed polymer skeleton (polymer shell model) is prepared using an organic material. The polymer shell model is placed in a die chamber having a tool punch. A metal or metal alloy powder material is used to partially fill the interior of the polymer shell model and a ceramic powder material is used to complete the filling of the interior cavity of the polymer shell model. A third powder material (same or different) is used to pack around the outside of the polymer shell model within the die chamber. The loaded die chamber is heated under vacuum or under oxygen/hydrogen free atmosphere conditions at a temperature, e.g. 600-1000 degrees Celsius, to decompose the organic material to create a graphite interface inner in the shape of the 3D printed polymer shell model. The remaining dual-powder powder assembly is sintered by applying appropriate technique(s), e.g. SLS (laser), to densify both of the interior powders into the metal-ceramic sinter-powder cast manufactured item, and to densify the exterior powder into a sacrificial part. The metal-ceramic cast item is released from the sacrificial part since the metal-ceramic cast item and the sacrificial part can be separated because of the double-layer graphite interface inner in the shape of the 3D printed polymer shell model.

Example—Dual Ceramic Cast Item

A 3D printed polymer skeleton (polymer shell model) is prepared using an organic material. The polymer shell model is placed in a die chamber having a tool punch. A first ceramic powder material is used to partially fill the interior of the polymer shell model and a second ceramic powder material is used to complete the filling of the interior cavity of the polymer shell model. A third powder material (same or different) is used to pack around the outside of the polymer shell model within the die chamber. The loaded die chamber is heated under vacuum or under oxygen/hydrogen free atmosphere conditions at a temperature, e.g. 600-1000 degrees Celsius, to decompose the organic material to create a graphite interface inner in the shape of the 3D printed polymer shell model. The remaining dual-ceramic powder assembly is sintered by applying appropriate technique(s), e.g. SLS (laser), to densify both of the interior powders into the dual ceramic sinter-powder cast manufactured item, and to densify the exterior powder into a sacrificial part. The dual ceramic cast item is released from the sacrificial part since the dual ceramic cast item and the sacrificial part are separatable because of the double-layer graphite interface inner in the shape of the 3D printed polymer shell model.

Having described embodiments for the invention herein, it is noted that modifications and variations can be made by persons skilled in the art in light of the above teachings, including unforeseen or unanticipated alternatives, modifications, variations, improvements, and functionally equivalent methods and apparatuses, all of which are considered within the scope of the disclosure. It is therefore to be understood that changes may be made in the particular embodiments of the invention disclosed which are within the scope and spirit of the invention as defined by the appended claims, along with the full scope of equivalents to which such claims are entitled. Having thus described the invention with the details and particularity required by the patent laws, what is claimed and desired protected by Letters Patent is set forth in the appended claims.

The invention claimed is:

1. A process for producing a sintered powder manufactured item, comprising the steps:
   STEP 1-performing 3D printing of a polymer shell model, of a manufactured item, the polymer shell model prepared using an organic material selected from the group consisting of acrylonitrile butadiene styrene (ABS), polycarbonate (PC), polylactic acid (PLA), high-density polyethylene (HDPE), PC/ABS, polyphenylsulfone (PPSU) and high impact polystyrene (HIPS);
   STEP 2-placing the polymer shell model in a die chamber having a tool punch;
   STEP 3-loading powder sintering material into the die chamber on the polymer shell model to create a powder-encased polymer shell model, the powder sintering material selected from the group consisting of stainless steel powder, titanium alloy powder, chromium alloy powder, nickel alloy powder, aluminum alloy powder, mixed metal powder, and ceramic powder, the powder sintering material having a particle size of 20-200 microns;
   STEP 4-vacuum or oxygen/hydrogen free atmosphere heating of the powder-encased polymer shell model to decompose the polymer shell model creating a graphite interface layer, said heating at 600-1000° C. for metal powder sintering material and 1000-2200° C. for ceramic powder sintering material;
   STEP 5-sintering of the powder-encased polymer shell model; and
   STEP 6-releasing a sinter-powder cast manufactured item from the die chamber using the tool punch.

2. The process of claim 1, wherein the vacuum or oxygen/hydrogen free atmosphere heating is vacuum heating at a pressure of from 1-10 Torr.

3. The process of claim 1, wherein the vacuum or oxygen/hydrogen free atmosphere is an atmosphere of inert gas selected from the group consisting of nitrogen, argon, and helium, to provide an atmosphere conducive to sintering.

4. The process of claim 1, wherein the powder sintering material is loaded in the die chamber around the polymer shell model and within the cavities of the polymer shell model, and wherein the powder sintering material loaded around the polymer shell model is the same or is different from the powder sintering material within the cavities of the polymer shell model, and wherein the sinter-powder cast manufactured item comprises a double-layer sinter-powder cast manufactured item, a dual metal sinter-powder cast manufactured item, a dual metal-ceramic sinter-powder cast manufactured item, or a dual ceramic sinter-powder cast manufactured item.

5. The process of claim 1, wherein the polymer shell model comprises a polymer skeleton, wherein the powder sintering material is loaded into the polymer shell model and surrounding the polymer skeleton to form a powder-encased polymer shell and powder surrounded skeleton model, wherein the powder-encased polymer shell and powder surrounded skeleton model is sintered to create a sinter-powder cast manufactured item having internal complex parts.

6. The process of claim 5, wherein the polymer shell model or polymer skeleton is coated by a ceramic powder sintering material to prevent eventual undesired carbonization reaction between the graphite powder formed from sintering the polymer shell model or polymer skeleton and the powder sintering material used to create the sinter-powder cast manufactured item.

* * * * *